United States Patent
Fioto, Jr. et al.

(10) Patent No.: US 7,987,109 B2
(45) Date of Patent: Jul. 26, 2011

(54) MODEL AND METHOD FOR CHANNEL-BASED WORKFORCE SOURCING

(75) Inventors: George A. Fioto, Jr., Raleigh, NC (US); Anthony E. Martinez, St. Augustine, FL (US); Nancy A. Reese, Ramsey, NJ (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 11/671,895

(22) Filed: Feb. 6, 2007

(65) Prior Publication Data

US 2008/0189160 A1    Aug. 7, 2008

(51) Int. Cl.
*G06Q 10/00* (2006.01)
(52) U.S. Cl. ............ 705/7.12; 705/7.11; 705/7.13; 705/7.14
(58) Field of Classification Search ........ 705/7.11–7.14; 718/100
See application file for complete search history.

(56) References Cited

U.S. PATENT DOCUMENTS

| | | | |
|---|---|---|---|
| 5,111,391 A * | 5/1992 | Fields et al. ............... 705/9 |
| 5,185,780 A * | 2/1993 | Leggett ............... 379/265.08 |
| 5,467,268 A * | 11/1995 | Sisley et al. ............... 705/9 |
| 5,586,021 A * | 12/1996 | Fargher et al. ............ 700/100 |
| 5,592,543 A * | 1/1997 | Smith et al. ............ 379/266.07 |
| 5,619,695 A * | 4/1997 | Arbabi et al. ............... 718/100 |
| 5,884,276 A * | 3/1999 | Zhu et al. ............... 705/8 |
| 5,918,207 A * | 6/1999 | McGovern et al. ............ 705/321 |
| 6,044,355 A * | 3/2000 | Crockett et al. ............... 705/8 |
| 6,130,942 A * | 10/2000 | Stenlund ............... 379/265.12 |
| 6,219,649 B1 * | 4/2001 | Jameson ............... 705/8 |
| 6,574,605 B1 * | 6/2003 | Sanders et al. ............... 705/8 |
| 6,625,577 B1 * | 9/2003 | Jameson ............... 705/8 |
| 6,732,079 B1 * | 5/2004 | Kintner et al. ............... 705/8 |
| 6,957,113 B1 * | 10/2005 | Logsdon et al. ............... 700/100 |
| 6,970,829 B1 * | 11/2005 | Leamon ............... 705/9 |
| 7,023,979 B1 * | 4/2006 | Wu et al. ............... 379/265.11 |
| 7,155,400 B1 * | 12/2006 | Jilk et al. ............... 705/9 |
| 7,191,139 B2 * | 3/2007 | Roy et al. ............... 705/321 |
| 7,519,539 B1 * | 4/2009 | Fliess et al. ............... 705/301 |

(Continued)

OTHER PUBLICATIONS

"An Integrated Approach for Modeling Uncertainty in Aggregate Production Planning" S. Daniel Thompson; Wayne J. Davis; IEEE Transactions on Systems, Man, and Cybernetics, vol. 20, No. 5, Sep./Oct. 1990.*

(Continued)

*Primary Examiner* — Romain Jeanty
*Assistant Examiner* — Alan Miller
(74) *Attorney, Agent, or Firm* — Scott, Murphy & Presser, P.C.; John R. Pivnichny

(57) ABSTRACT

A model and method for channel-based workforce sourcing is provided. In one aspect, a computer model is populated to create a baseline capacity, including a current number of resources in each of a plurality of skill, sets for each of a plurality of available channels. The computer model is also populated with one or more modulators that affect business-defined values. A desired channel mix, for example, for a given time period may also be recommended and specified in the model. The model is validated and updated with additional or new information. The model and method then automatically generates a starting headcount based on the baseline capacity and ending headcount based on the one or more modulators. The model and method may also generate a targeted plan over a given period for achieving the ending headcount from the starting headcount according to desired channel mix.

4 Claims, 2 Drawing Sheets

U.S. PATENT DOCUMENTS

| | | | |
|---|---|---|---|
| 7,596,416 B1* | 9/2009 | Maluf et al. | 700/1 |
| 7,650,293 B2* | 1/2010 | Kiran et al. | 705/8 |
| 7,805,382 B2* | 9/2010 | Rosen et al. | 705/321 |
| 2001/0049615 A1* | 12/2001 | Wong et al. | 705/8 |
| 2002/0069080 A1* | 6/2002 | Roy et al. | 705/1 |
| 2003/0125996 A1* | 7/2003 | Bush et al. | 705/7 |
| 2003/0212624 A1* | 11/2003 | Sanghavi et al. | 705/37 |
| 2003/0229529 A1* | 12/2003 | Mui et al. | 705/8 |
| 2004/0024674 A1* | 2/2004 | Feldman | 705/36 |
| 2004/0083195 A1* | 4/2004 | McCord et al. | 706/47 |
| 2004/0162748 A1* | 8/2004 | Vogel et al. | 705/8 |
| 2004/0162749 A1* | 8/2004 | Vogel et al. | 705/8 |
| 2004/0162753 A1* | 8/2004 | Vogel et al. | 705/10 |
| 2005/0119928 A1* | 6/2005 | Deitrich et al. | 705/9 |
| 2005/0131754 A1* | 6/2005 | Chapman et al. | 705/10 |
| 2005/0240465 A1* | 10/2005 | Kiran et al. | 705/10 |
| 2006/0047530 A1* | 3/2006 | So et al. | 705/1 |
| 2007/0166685 A1* | 7/2007 | Gilbert et al. | 434/323 |
| 2008/0059290 A1* | 3/2008 | McFaul | 705/11 |

OTHER PUBLICATIONS

"Organizational Behavior, Strategy, Performance, and Design in Management Science" John W. Boudreau; Management Science, vol. 50, No. 11 (Nov. 2004), pp. 1463-1476 Informs.*

"Routing Heuristics for Multi-Skill Call Centers" Ger Koole; Auke Pot; Jerome Talim; Proceedings of the 2W3 Winter Simulation Conference S. Chick P. J. Sanchez, D.Ferrin, and D. J. Morrice, eds.*

"Optimization of Maintenance Organization and Manpower in Process Industries", Knapp, Gerald M.; Mahajan, Milind; Journal of Quality in Maintenance Engineering, 1998, pp. 168-183.*

* cited by examiner

MODEL AND METHOD FOR CHANNEL-BASED WORKFORCE SOURCING

FIELD OF THE INVENTION

The present disclosure generally relates to resource planning and more specifically to a model and method for channel-based workforce sourcing.

BACKGROUND OF THE INVENTION

Capacity Management is series of processes seeking to ensure that organizations operate at optimum capacity while maintaining high levels of customer satisfaction. To be valuable to the business, Capacity Management requires the ability to balance resource demand against all available supply sources, attempting to minimize fulfillment time and to maximize business performance through the optimal use of low cost sourcing across an entire organization.

Existing implementations of Capacity Management do not address planning across a broad organizational structure or a longer timeframe. Instead, they rely on the use of varying local tools and spreadsheets with a more narrow and tactical view to capture headcount-based information about current and future needs. Since the primary focus is balancing to the local financial plan, there is often no direct linkage to strategic skill management. These methods, although sufficient to react to immediate headcount needs at the local level, do not address the requirement for a more strategic view across a wider organizational structure. They also do not account for the actual skills required. The result is sub-optimal resource capacity as evidenced by simultaneous skill shortages and idle capacity, and labor costs that may exceed the market norms. This situation exists in any large scale services business where there are multiple business units, such as divisions within a company or different geographic locations, all with the potential for overlapping skills and multiple channels to supply the required resources.

SUMMARY OF THE INVENTION

A method for channel-based workforce sourcing is provided. In one aspect, the method may comprise populating a computer model to create a baseline capacity, including a current number of resource in each of a plurality of skill sets for each of a plurality of available channels and populating one or more modulators in the computer model with one or more business-defined values that assist in reducing a number of decisions to be made for the skill sets. The method also may includes validating the computer model, updating the computer model having a baseline capacity with latest business direction to address revised quality policies and changing client preferences, determining a channel mix, generating a starting headcount based on the baseline capacity and ending headcount based on the one or more modulators for a given period and generating a targeted plan over a given period for achieving the ending headcount from the starting headcount according to the channel mix.

Further features as well as the structure and operation of various embodiments are described in detail below with reference to the accompanying drawings. In the drawings, like reference numbers indicate identical or functionally similar elements.

DETAILED DESCRIPTION OF THE PREFERRED EMBODIMENTS

Figure 1:
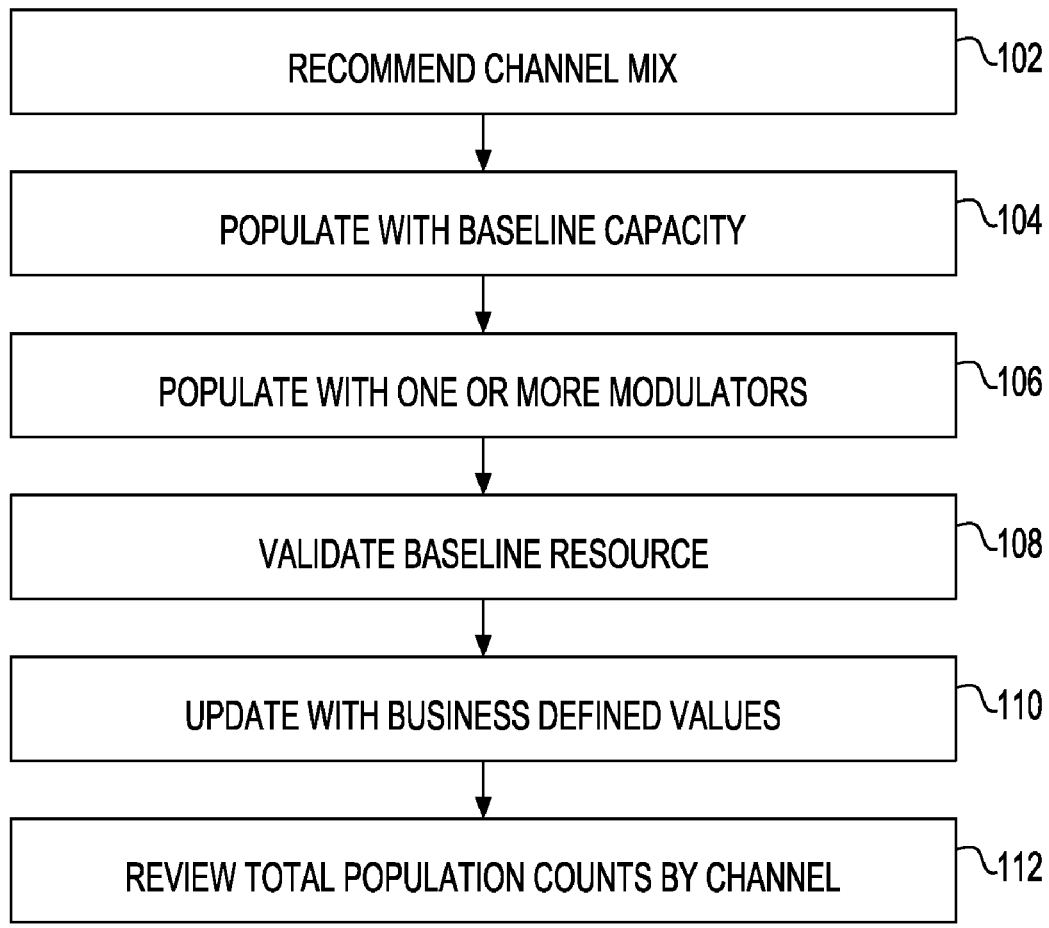
FIG. 1 is flow diagram illustrating a sourcing process in one embodiment of the present disclosure.

A Sourcing Process and Model (SPM) described in this disclosure in an exemplary embodiment provides a consistent and disciplined means for capturing and consolidating current and future skill requirements, for example, including headcount, sourcing channels and timing of the requirements. The SPM provides a process with a supporting tool to document a business unit's on-board headcount based on the use of common skill terminology. Through the application of variables, it results in the development of sourcing policies and desired channel mix. In one embodiment, these policies provide quantitative guidance on the skills required for the desired source channel and expected timing of each to meet anticipated demand. The end result in one embodiment is an actionable plan that can be used to adjust the various workforce labor pools to ensure the delivery of optimum business performance for the business unit. The use of a consistent process also allows consolidation across business units within a company and the development of guidelines and policies, which are scalable to any level.

The implementation of these novel sourcing processes and policies enables a business unit to ensure it has the right supply of skills and capabilities at the right time, cost and location to satisfy client needs. The SPM provides the structure to plan for resource requirements across an extended period of time defined by the business unit, for example, four quarters, 18 months, etc. Through on-going updates at an agreed upon cycle, the process allows a business unit to react to changing conditions in the marketplace on a timely and cost-effective basis, and to understand the impact of capacity variances to the business or financial plan. The SPM allows the application of variables that are inputs to Capacity Management to generate the sourcing strategy. The planning elements, which impact the outcome and their usage may include but are not limited to the following.

1. Identification of the key skills and their attributes as the starting point to analyze and aggregate requirements.

2. Capture of resource-related data in the SPM for each of the skills that are in use to establish the capacity baseline for each business unit. This may include current counts and historical demographics for each of the channels or labor pools. Examples of possible source channels are regular employees, borrowed labor, subcontractors, affiliates, and global delivery.

3. Review of opportunities and market research to determine the expected impact on resource requirements.

4. Document the impact of anticipated growth or decline in demand for each skill. The growth can be consistent across all channels, or can be specified individually for each channel. For the rest of the description in the present disclosure, a single rate will be used for illustrative purposes only. This may be expressed in a percentage that is spread across the predefined timeline for the business unit, and provides the timing of gap resolution activities.

5. Review the current channel mix for each skill and make adjustments to the mix. This may include direction provided to each business unit regarding skills that are critical to keep "in-house" vs. obtaining from outside sources, or cost-related factors. The total capacity and sourcing mix across the timeline sets the strategic direction for Capacity Management.

6. The SPM also provides for the ability to factor in an assumed voluntary attrition rate for each skill so these anticipated losses can be considered in the Capacity Management decisions.

The end result of this process is an aggregated plan showing delivery resources by channel over a business-defined time horizon, which is reconciled to the business unit's financial plan headcount and cost assumptions. These results can then be consolidated at multiple levels to gain visibility across larger parts of an organization. The SPM provides a consistent means to identify the specific skill mix and types of resources that can deliver each skill to be able to respond competitively to market demand and to meet financial targets. The resulting sourcing strategy influences several key resource-related areas. For example, Capacity management focuses on balancing resource demand against the available supply sources, attempting to minimize fulfillment time and maximize business performance through the optimal use of low cost channels. Utilizing the output of the SPM, Capacity management has a view of what the channel mix should look like at the end of the time horizon and the number of required resources for each, and can make decisions that support achieving the sourcing strategy. Resource Deployment ensures that clients' skill demands are met in a timely manner by leveraging the appropriate resource supply as defined in the sourcing strategy. The SPM documents that strategy, providing the guidance to ensure that staffing decisions, especially for long-term projects, support the desired skill and channel mix. Expertise Management takes the output of the SPM and uses it to provide guidance in the development of individual career and skill development activities to meet the needs of employees, clients and the business. The ability to combine several levels of the SPM to gain a broader view across an organization can also support development of formal training to address the needs of a larger group of employees.

The SPM consolidates common Capacity Management principles into a single process that can be consistently deployed. In one embodiment, it is based on combining resource specifics (headcount, skills, sourcing channel) and expected market requirements with the defined business goals and strategy. Incorporating the impact of each of these in the SPM yields a documented strategy for use in making decisions.

FIG. 1 is a flow diagram illustrating an SPM process in one embodiment. In the description below, "Skill Set" is being used as the common terminology for describing and inventorying resource pools. An example of a Skill Set may include but is not limited to "Application Architect-SAP". In one embodiment, each Skill Set has characteristics that distinguish it from all others, allowing resource managers to define sourcing strategies for each one individually. All individuals within a single Skill Set are reasonably interchangeable, regardless of the channel, to allow the sourcing strategy to be actionable.

At 102, a business unit may recommend a default channel mix percentage for each Skill Set based on any one of the Skill Set attributes. Attributes can represent any natural collection of skill sets that may carry a similar sourcing strategy, such as all skill sets related to a specific application development software package. This allows a predefined sourcing direction to be incorporated at the start of the process. This step may be optional. At 104, a user such as an administrator pre-populates a model with a baseline capacity, which for example includes the current number of resources in each of the Skill Sets for each of the available channels. Populating the SPM may be done via queries against current operational databases designed to capture actual skill sets and number of resources on-board or in use from each sourcing channel. Organizations may be using one or more of the channels in their current delivery strategy. It should be understood that steps 102 and 104 need not be performed in the order shown, that is, they may be performed asynchronously, independent of one another. At 106, various modulators in the SPM can also be pre-populated with business-defined values that help to reduce the number of decisions to be made for each Skill Set. Examples of modulators may include but are not limited to:

a. Percent of growth in the next year. Example: a standard value of 2% growth may be established for each Skill Set, then only growth above or below this may need to be modified, for example, by a capacity manager. Changing the estimated growth may be done as a result of dialog with business leaders who have direct knowledge of demand and market expectations.

b. Spread of the growth across the timeline. If quarters are used as the timeframe, one may set this at 25% per quarter, or if high growth is anticipated in any one quarter, the spread can be preset for all Skill Sets to take that into account, requiring that only Skill Sets with differences be adjusted. Normally, this variable will be adjusted when an inflection point in demand is anticipated, which may be rare.

c. Attrition rate. This can be preloaded at the same rate, typically available at a business unit level, for each of the Skill Sets. Those Skill Sets experiencing unusually high or low attrition may be modified to reflect the actual or anticipated rate.

d. Growth for an extended timeframe, such as the upcoming two years. This can be preloaded with a minimal growth percentage, allowing the rates for Skill Sets that will have unusually higher or lower growth to be adjusted as a means of providing headlights to upcoming requirements.

Once the baseline SPM has been executed, the sourcing guidance that has been generated can be made available to users such as the capacity leaders for updating with the latest business direction, for example, to address revised quality policies and changing client preferences. This may be accomplished either through distribution to various leaders or allowing access to a centralized repository. At 108, users such as capacity leaders validate the baseline resource counts for each of the sourcing channels. Validation allows accuracy in the system because the starting headcounts are used as the basis for the calculations that generate the required number of resources at the end of the established timeline. At 110, once validated, the users such as capacity leaders review and update the business-defined values in each of the pre-populated fields to ensure they represent the expected growth and attrition rate for each of the Skill Sets for their own business unit. Each Skill Set is reviewed and updated to reflect the desired channel mix at the end of the established timeline. For each Skill Set, the future channel mix can be influenced by many factors, including the needed level of control, the competitive cost trend, or a strategic shift set by the corporation. In one embodiment, decisions on changes to the channel mix are made on a one-by-one basis since there are some Skill Sets that an organization may want to retain "ownership" of regardless of the cost of the resource. Once all of the assumptions and variables have been entered into the SPM, the result is a starting and ending resource headcount by channel for each of the Skill Sets, providing visibility to the rate of increase or decrease. At 112, to complete the Sourcing Process and Model, the total population counts by channel may be reviewed. Tools such as Excel-based pivot tables can be used to allow a variety of comparisons, including headcount change by channel over the time period. These numbers are then compared to the current financial commitment to ensure that the documented sourcing strategy, when executed, will deliver the financial objectives of the organization. If not, the capacity leader adjusts some of the values to ensure that the SPM and the financial commitments are interlocked. Thus, after a user such as validates and updates a populated model (for example, that includes baseline capacity, recommended channel mix, and additional information or factors referred to as modulators), the model automatically generates starting and ending resources by channel for each skill sets. The automatically computed information then may be reviewed again by users such as the capacity planning managers or the like.

Once the documentation of the sourcing plans is completed, the SPM administrator consolidates individual business unit plans for higher level review and action. The consolidated data can be structured as a "flat file" in various tools with predefined input templates and reporting options. The unique ability to consolidate the documented SPM guidance for each business unit provides the opportunity to review Capacity Management direction across the broader organization. The ability to analyze at this level provides additional insights that may not be visible when viewing smaller subsets. The aggregated data may identify regional differences or signal broad imbalance requiring larger scale action plans. When regional differences are observed, management can be alerted to rebalancing options that may have otherwise gone unnoticed. Alternatively, it could bring to light best practices that could be shared. When all regions see a common trend, the early warning may prompt business leaders to combine investment funds in learning, hiring campaigns, or other gap resolution activities. With constantly changing demand for skilled resources and a significant percentage of capacity being sourced from outside each organization, having a clear and accurate inventory of its own employees' skills may not be sufficient. The disciplined techniques being driven by the Sourcing Process and Model will help ensure that the right internal resources are being developed, hired and retained, and that alternative resource channels are utilized to ensure the right skills are available at the right time, cost and location.

Figure 2:
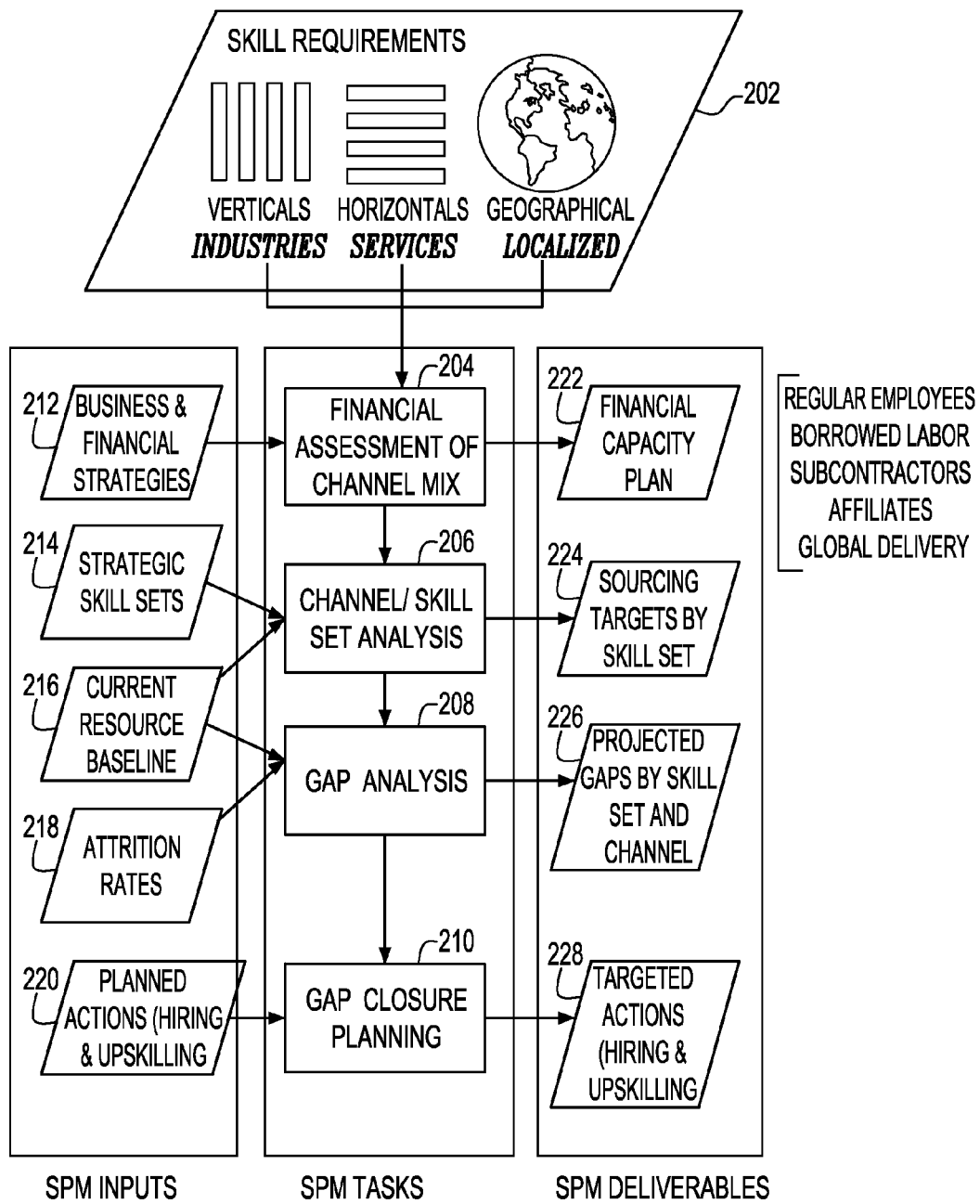
FIG. 2 is another diagram illustrating a sourcing process in one embodiment of the present disclosure.

FIG. 2 is another diagram illustrating a sourcing process in one embodiment of the present disclosure. Various skill requirements 202 may include skills across industries and services from geographical locations. Skill requirements may be satisfied from different channels such as regular employees, borrowed labor, sub-contactors, affiliates, and/or global delivery. According to one or more business and financial strategies or constraints 212, current skill set channel mix is assessed at 204 and used as input to produce a current financial capacity plan 222. At 206, the assessed channel mix and skill set is analyzed, incorporating the strategic skill sets 214 and current resource baseline 216 to derive sourcing targets by skill set 224. At 208, gap analysis is performed using current resource baseline 216 and factors such as attrition rates 218 to derive projected gaps by skill set and channel mix 226. At 210, the projected gap may be filled using planned actions 220. Examples of planned actions may include but are not limited to hiring, training, upskilling, transferring, etc. Targeted actions 228 are derived from the planned actions to fill the identified gaps.

In the example below, a skill set named "Application Developer—Java" is used as an example of this process. The starting headcount is 100, sourced completely from the Regular (permanent and local) population. Market demand is anticipated to grow over the next year, and downward cost pressure will likely require the business to change its channel mix. The sample Sourcing Model has been structured to cover four quarters and in this example, the demand increase is expected in the first two quarters. Headcounts and gaps are calculated in the model based on the net effect of the assumptions. In the example, an excess of regulars is expected, suggesting the additional step of determining the planned actions. These actions can be documented in the SPM as well, making them available for collaboration with other organizations. In the below example, the desired channel mix did not take place until the $2^{nd}$ Quarter (2Q).

EXAMPLE

| Skill Set = Application Developer - Java | |
|---|---|
| Current Headcount: | 100 |
| Required HC at end of 2007: | 110 |
| Preloaded Annual Growth Rate: | 2% |
| Preloaded Growth Spread: | 25% per quarter |
| Current Channel Mix: | 100% Regulars |
| Quarterly Attrition Rate: | 2.5% |
| Actions in Sourcing Model: | |
| Validated Current Headcount | 100 |
| Updated Annual Growth Rate: | 10% |
| Updated Growth Spread: | 50%, 50%, 0%, 0% |
| Desired Channel Mix: | 75% Regulars, 25% Global Delivery |
| Quarterly Attrition Rate: | 2.5% |

| Gaps to be Resolved: | | | | | |
|---|---|---|---|---|---|
| | Start | 1Q | 2Q | 3Q | 4Q |
| Total HC Needed | 100 | 105 | 110 | 110 | 110 |
| Regulars HC Needed: | 100 | 91 | 83 | 83 | 83 |
| Total HC On-board after Attrition | 100 | 97 | 94 | 91 | 88 |
| Regular HC Gap | 0 | −6 | −11 | −8 | −5 |
| HC Required from Other Channels | 0 | 14 | 27 | 27 | 27 |

In one embodiment, the SPM is based on having consistent Skill Set names. The ability to document business unit level recommendations on the sourcing mix gives the capacity leaders a basis on which to make their own decisions. For instance, recommended channel mix for different skill sets may be expressed in a form of a spreadsheet model. This may be done at a global company level, unit by unit level, etc. An example may include a recommendation that an enterprise integration application architect skill set may be comprised of 90% from regular employee pool and 10% from a subcontractor pool. Another example may be that 75% of wireless application architects may be regular employees and the remaining 25% subcontractors.

A capacity leader or any other persons involved in capacity management or has knowledge of capacity management may indicate the expected growth or decrease over the predefined timeline for a business unit. They may do this from knowledge of market conditions and project portfolio. The indication may be provided based on a quarterly cycle. Using the expected growth rate and other factors such as the attrition rates, an ending headcount may be projected and presented on a periodic basis, for instance, quarterly basis, along with an action plan for achieving the ending headcount from the baseline count. In order to have an accurate view of required increases or decreases in capacity, factors such as attrition rates may be factored into the gap. A default rate can be pre-populated, with the ability to adjust them up or down based on actual experience or expected shift. The capacity leaders can then see the required increases or decreases based on their assumptions as well as the additional impact of attrition.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for channel-based workforce sourcing, comprising:

populating a computer model to create a baseline capacity, including a current number of resource in each of a plurality of skill sets for each of a plurality of available channels;

populating one or more modulators in the computer model with one or more business-defined values that assist in reducing a number of decisions to be made for the skill sets, wherein the one or more modulators include expected growth or decrease, and specified growth or decrease across a time horizon;

validating the computer model;

updating the computer model having a baseline capacity with latest business direction to address revised quality policies and changing client preferences;

determining a channel mix;

generating, by a processor, a starting headcount based on the baseline capacity and ending headcount based on the one or more modulators for a given period;

generating, by the processor, a targeted plan over a given period for achieving the ending headcount from the starting headcount according to the channel mix; and repeating the above steps for each of a plurality of business units wherein a plurality of targeted plans for the plurality of business units are consolidated into a structured flat file.

2. The method of claim 1, further including:

recommending a channel mix percentage for the skill set based on one or more of skill set attributes.

3. The method of claim 1, further including:

comparing a headcount in the updated computer model with current financial commitment.

4. The method of claim 1, wherein the one or more modulators include an attrition rate.

* * * * *